United States Patent
Moine et al.

(10) Patent No.: US 6,334,357 B2
(45) Date of Patent: *Jan. 1, 2002

(54) INTERNAL COMBUSTION ENGINE MISFIRE DETECTION METHOD

(75) Inventors: Xavier Moine, Rueil Malmaison; Luis Rodrigues, Paris, both of (FR)

(73) Assignees: Renault, Boulogne Billancourt; Siemens Automotive S.A., Toulouse, both of (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,614

(22) PCT Filed: Aug. 1, 1997

(86) PCT No.: PCT/FR97/01441

§ 371 Date: Aug. 9, 1999

§ 102(e) Date: Aug. 9, 1999

(87) PCT Pub. No.: WO98/05936

PCT Pub. Date: Feb. 12, 1998

(30) Foreign Application Priority Data

Aug. 2, 1996 (FR) .............................. 96 09780

(51) Int. Cl.⁷ .............................................. G01M 15/00
(52) U.S. Cl. ...................................................... 73/117.3
(58) Field of Search ............................... 73/116, 117.2, 73/117.3; 340/438, 439; 701/101, 102, 110, 111

(56) References Cited

U.S. PATENT DOCUMENTS

| | | | |
|---|---|---|---|
| 5,044,195 A | * | 9/1991 | James et al. ................ 73/117.3 |
| 5,269,178 A | * | 12/1993 | Vigmostad et al. ............ 73/116 |
| 5,313,826 A | * | 5/1994 | Klauber et al. ............. 73/118.1 |
| 5,357,788 A | * | 10/1994 | Kantschar et al. .......... 73/117.3 |
| 5,381,688 A | * | 1/1995 | Ikeda et al. .................... 73/105 |
| 5,440,921 A | * | 8/1995 | Matsuno et al. ............ 73/117.3 |
| 5,504,682 A | * | 4/1996 | Shiraishi et al. ............ 73/117.3 |
| 5,505,087 A | * | 4/1996 | Angermaier et al. ....... 73/117.3 |
| 5,507,180 A | * | 4/1996 | Tomisawa ................... 73/117.3 |
| 5,515,281 A | * | 5/1996 | Palazzetti et al. ........... 73/117.3 |
| 5,841,025 A | * | 11/1998 | Remboski et al. .......... 73/117.3 |
| 5,869,752 A | * | 2/1999 | Klauber et al. ................ 73/116 |

FOREIGN PATENT DOCUMENTS

| | | | |
|---|---|---|---|
| DE | 43 16 409 A | * | 11/1994 |
| DE | 44 35 654 A | * | 4/1995 |
| EP | 0710772 A | * | 5/1996 |
| EP | 0711989 A | * | 5/1996 |
| GB | 2271854 A | * | 4/1994 |

* cited by examiner

Primary Examiner—Eric S. McCall
(74) Attorney, Agent, or Firm—Oblon, Spivak, McClelland, Maier & Neustadt, P.C.

(57) ABSTRACT

A method for detecting a misfire in at least one truck or motor vehicle internal combustion engine cylinder by analysing the values (Cg, n, i) of a quantity (Cg) characteristic of combustion and generated by observing the rotation of the crankshaft to detect the occurrence of a misfire. According to the method, misfire detection is suspended for a predetermined time when the analysis of said values (Cg, n, i) reveals anomalies originating in the transmission power line between the drive shaft and the vehicle wheels.

9 Claims, 3 Drawing Sheets

INTERNAL COMBUSTION ENGINE MISFIRE DETECTION METHOD

BACKGROUND OF THE INVENTION

1. Field of the Invention

The present invention relates to a process for detection of misfires of an internal combustion engine mounted in a motor vehicle.

2. Discussion of the Background

In the scope of antipollution regulations such as the American OBD standards (On Board Diagnostic), it is required that electronic engine control systems of motor vehicles must be able to diagnose certain engine dysfunctions which influence pollutant emissions.

For this reason it is planned, in future electronic engine control systems, to install systems capable of diagnosing proper operation of the oxygen sensor or of the EGR loop (exhaust gas recirculation), wherein recognition of a malfunction which affects pollutant emissions must trip activation of less intensive modes of operation and/or must turn on a light on the dashboard to warn the driver (relaxed regulations) or must stop the vehicle (strict regulations).

In particular, the American and European standards provide for requiring detection of misfires and for identification of the cylinder or cylinders responsible. Such detection must, for example, furnish the percentage of misfires occurring in a given number of engine cycles.

The equipment designers and automobile manufacturers have therefore developed a certain number of techniques for detection of misfires.

Thus, there can be cited the accelerometer method, which comprises detecting a misfire by analysis of the variation of longitudinal acceleration of the vehicle, or the method using an oxygen-proportional sensor disposed in the exhaust line. There can also be cited the method using pressure sensors communicating with the combustion chambers, or that based on measurement of arc voltage or ionization current of the spark plugs (for controlled ignition engines).

The most commonly used method, however, is that which deduces the existence of misfires by measurement of the instantaneous speed of the crankshaft. The use thereof is actually extremely simple, since it involves merely applying software processing of the signal furnished by the angular position sensor of the crankshaft, a signal which is already used by the engine control system to control fuel injection, and so no specific equipment-related device is required for implementation of this method.

The analysis solely of the signal furnished by the crankshaft position sensor to detect possible misfires nevertheless suffers from certain disadvantages.

The method of detection of misfires is in fact based on the postulate that a misfire is manifested by a drop of the gas torque, which in turn generates a corresponding change of the instantaneous speed of the crankshaft. To identify misfires, therefore, it is sufficient to record the changes in instantaneous speed of the crankshaft.

However, the instantaneous speed of revolution of the crankshaft and of the engine flywheel integral therewith reflects not only the operation of the engine and the alternating thrust of the connecting rods under the effect of combustion of the carburetted mixture, but also the operation of the entire kinematic chain connecting the engine to the tire/ground interface.

In fact, the mechanical energy at the end of the crankshaft is transmitted to the wheels by a transmission system which traditionally comprises a clutch, a speed-change box and a differential, this transmission system possessing its own damping and stiffness. As a result, therefore, any abrupt variation of torque involving any of the elements of the kinematic chain, such as, for example, involving the vehicle's wheels because of poor condition of the roadway surface, is fed back to the crankshaft in the form of oscillations, the magnitude of which will depend on the characteristics of the transmission system and of the perturbation.

As a result, the abrupt changes in instantaneous speed of the crankshaft are therefore caused not solely by misfires but also by all the perturbations capable of affecting the kinematic transmission chain, and therefore especially a roadway in poor condition.

For correct and exclusive identification of misfires, therefore, it seems important to be able to distinguish, among the changes of crankshaft speed, those due effectively to drops of gas torque from those having other causes, so that the latter are not counted.

To achieve this, additional strategies for deactivation of the program for detection of misfires therefore have been developed, which strategies are based on recognition of perturbations affecting the kinematic transmission chain. Thus, there can be cited strategies which use the information of wheel speed furnished by a specific sensor or else those requiring an accelerometer. There can also be cited the method described in British Patent GB A 2290870, which attempts to identify such perturbations by fuel motion in the fuel tank.

It nevertheless appears at present that none of the proposed methods is capable of distinguishing, in simple, economic fashion and with sufficient precision and reliability, the changes of crankshaft speed caused by perturbations which affect the kinematic transmission chain.

SUMMARY OF THE INVENTION

The object of the present invention is therefore to provide a process for detection of misfires which remedies the above-mentioned disadvantages.

The process according to the invention for detecting a misfire relates more particularly to multi-cylinder internal combustion engines for motor or road vehicles. This process is performed by analysis of the values of a variable representative of the gas torque of firing quality deduced from the crankshaft rotation, to detect the occurrence of a misfire.

According to the invention, the process for detection of a misfire is characterized in that detection of misfires is suspended for a predetermined period, when the analysis of these values characteristic of firing quality reveals anomalies originating from the kinematic transmission chain connecting the engine shaft with the vehicle's wheels, this detection of misfires being suspended when the considered values characteristic of firing become higher than a given threshold known as the upper threshold.

The innovation of the invention is to deduce directly from the signal used to identify misfres the occurrence of perturbations in the transmission likely to falsify the identification of misfires.

The principle of the strategy according to the invention is based on the fact that, in contrast to misfires, which can merely cause a drop of the observed signal, the perturbations originating from the kinematic chain for transmission of engine motion to the wheels cause both drops and rises of the level of the observed signal, and do so in generally alternating fashion.

According to another characteristic of the process of the invention for detecting a misfire, said process comprises the following operations executed after each firing:

(a)—a value characteristic of firing is produced;
(b)—this value characteristic of firing is compared with the upper threshold;
(c)—when the value characteristic of firing is higher than the upper threshold, the detection of possible misfires is suspended for a predetermined period;
(d)—otherwise, this value characteristic of firing is compared with a threshold value known as the lower threshold;
(e)—the existence of a misfire is detected when the considered value characteristic of firing is lower than the lower threshold.

According to another characteristic of the process of the invention for detecting a misfire, the upper threshold is a function of the considered value characteristic of firing.

According to another characteristic of the process of the invention for detecting a misfire, the upper threshold is a function of the lower threshold.

According to another characteristic of the process of the invention for detecting a misfire, the upper threshold is a function of the considered value characteristic of firing and of the lower threshold, after appropriate statistical processing of these parameters.

According to another characteristic of the process of the invention for detecting a misfire, the upper threshold is predefined as a function of the operating conditions of the engine.

According to another characteristic of the process of the invention for detecting a misfire, the predetermined period during which possible detections of misfires are no longer taken into account is constant.

According to another characteristic of the process of the invention for detecting a misfire, the predetermined period during which possible detections of misfires are no longer taken into account is predefined as a function of the operating conditions of the engine.

According to another characteristic of the process of the invention for detecting a misfire, the predetermined period during which possible detections of misfires are no longer taken into account retroactively encompasses a given number of preceding firings.

BRIEF DESCRIPTION OF THE DRAWINGS

The objectives, aspects and advantages of the present invention will be better understood from the description presented hereinafter of different embodiments of the invention, given as non-limitative examples, with reference to the attached drawing, wherein.

DETAILED DESCRIPTION OF THE PREFERRED EMBODIMENTS

Figure 1:
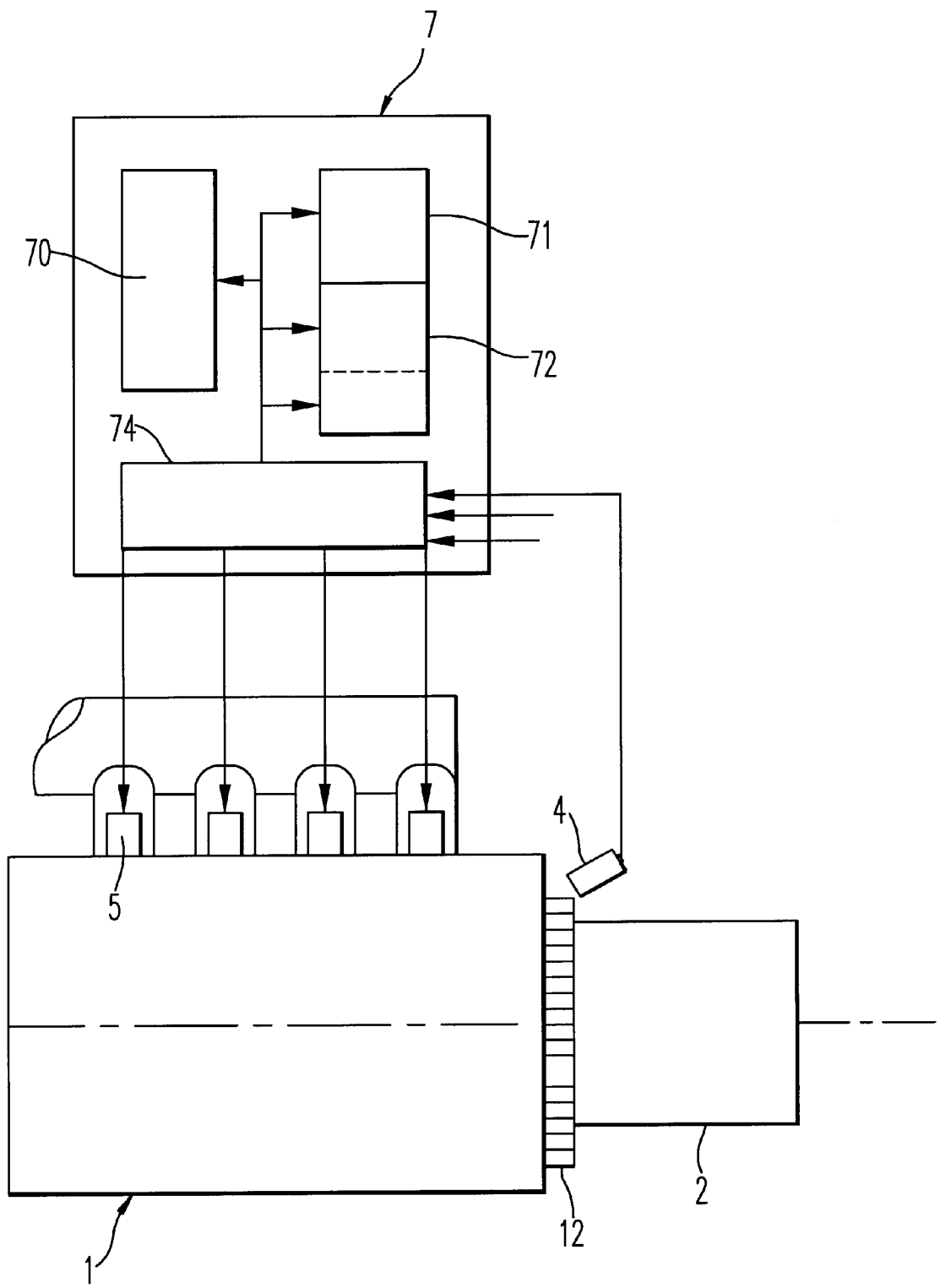
FIG. 1 is a partial view of an internal combustion engine equipped with an engine control system permitting use of the process according to the invention.

Referring to FIG. 1, there is seen a simplified sketch of an engine control system using the process according to the present invention for detecting misfires. Only the constituent parts necessary for understanding of the invention have been shown.

The internal combustion engine, which is reference 1, is designed more particularly as equipment for a motor or road vehicle. Engine 1 is connected to a transmission device suitable for transmitting motion to the vehicle's wheels. This transmission device classically comprises a clutch, a speed-change box 2 and a differential, not illustrated.

The four-cycle multi-cylinder engine 1 is equipped with a fuel-injection device of the multi-point type with electronic control, by virtue of which each cylinder is supplied with fuel from a specific electronic injector 5.

Opening of each electronic injector 5 is controlled by the electronic engine control system 7, which adjusts the quantity of fuel injected and the instant of injection into the cycle as a function of engine operating conditions, in such a way that the richness of the combustible air-fuel mixture admitted to the cylinders is adjusted automatically and precisely to a predetermined setpoint value.

The electronic engine control system 7 classically comprises a microprocessor 70, read-write memories 71, read-only memories 72, analog-to-digital converters 74 and various input and output interfaces.

Microprocessor 70 is provided with electronic circuits and software appropriate for processing the signals originating from suitable sensors, for determining the states of the engine and for initiating predefined operations in order to generate control signals destined in particular for the injectors (and for the ignition coils in the case of a controlled ignition engine), so as to ensure optimum management of the firing conditions in the engine cylinders.

The input signals of microprocessor 70 include in particular those addressed by a crankshaft sensor 4. This sensor 4, of the variable reluctance type, for example, is mounted immovably on the engine frame at a position in front of a measuring gear 12 fixed to one end of the crankshaft.

This gear 12 is provided on its periphery with a succession of teeth and spaces, which are identical with the exception of one tooth, which has been removed in order to define an absolute reference with which there can be deduced the instant at which a given reference cylinder, in the present case cylinder No. 1, passes top dead center.

Sensor 4 delivers a signal Dn corresponding to the procession of the teeth of gear 12, which signal is processed to generate a TDC signal during each half-revolution of the crankshaft, thus making it possible to identify in alternation the passes of cylinders No. 1, 3, 4, 2 through top dead center.

Processing of signal Dn emitted by sensor 4 also makes it possible to measure the speed of procession of the teeth of gear 12, and thus to record the instantaneous speed of revolution of the engine.

The process according to the invention for detection of misfires takes place by analysis of a variable characteristic of the quality of the firings occurring in each of the engine cylinders. More precisely, this variable is the gas torque, for which the calculation of a representative value obtained by spectral analysis of the instantaneous crankshaft speed has been disclosed in particular in French Patent Applications No. 91/11273 and 91/11274 filed by the Applicant in relation to a "process and device for measuring the gas torque of an internal combustion heat engine".

During operation of the engine, appropriate calculating means activated by microprocessor 70 therefore furnish successive torque values $Cg,n,i$ to characterize the value of the gas torque Cg corresponding to the n-th firing of cylinder No. i during the considered operating period.

These values are then processed by specific calculation means designed to use the process according to the invention, or in other words to mark the occurrence of misfires as well as the torque perturbations due to the transmission device and in particular to the roadway on which the vehicle is traveling.

Figure 2:
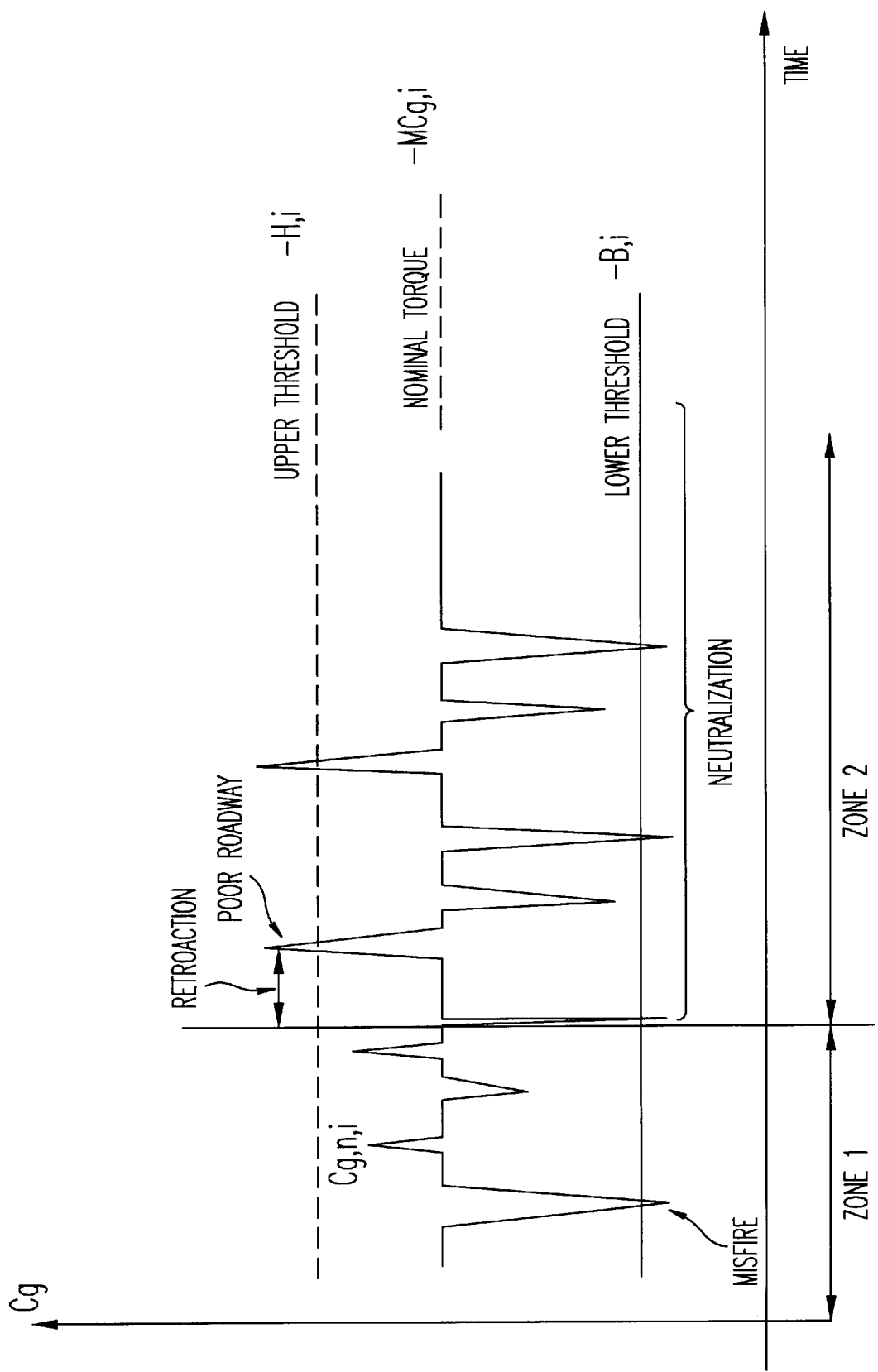
FIG. 2 is a timing diagram indicating the principle of the process according to the invention for detection of misfires.

The graph of FIG. 2 illustrates the principle of the invention.

For stabilized engine operating conditions, and when the transmission device is not subject to any significant perturbation, as in zone 1 of the graph, the values of the gas torque Cg,n,i for a given cylinder i then vary slightly on both sides of a nominal value MCg,i. When a misfire occurs in this cylinder, the corresponding torque then drops appreciably.

To identify misfires, therefore, it is sufficient to compare, for each firing, the torque with a suitable threshold value, known as the lower threshold B,i. This lower threshold B,i is plotted, for example, according to the engine operating conditions and stored in the memories of engine control system 7.

Quite obviously this strategy is non-limitative, since it is also possible to identify the occurrence of a misfire by comparing the difference between the torque value Cg,n,i which has just been calculated and the value Cg,n−1,i obtained in the preceding cycle with a suitable threshold value, which is plotted, for example, according to the engine operating conditions and stored in the memories of engine control system 7.

For stabilized engine operating conditions, and when the transmission device is subject to significant perturbations, as in zone 2 of the graph, the values of the gas torque Cg,n,i for cylinder i then vary greatly on both sides of the nominal value MCg,i. The Applicant has in fact been able to observe that perturbations in crankshaft rotation due to the transmission device, such as, for example, driving on a roadway with surface in poor condition, on paving stones, on corrugated sheet, etc., are reflected by symmetric variations of instantaneous torque Cg,n,i relative to the nominal torque Cg,i.

Since the existence of these large variations on both sides of the nominal value, and therefore of significant deviations from nominal torque MCg,i, have proved to be characteristic of perturbations of the transmission device, it is sufficient to identify these deviations in order to suspend the detection of misfires, which is no longer significant, because drops of torque below the lower threshold B,i are then related not to poor firing but to the roadway condition.

Identification of perturbations is achieved in simple fashion by introducing a threshold value known as the upper threshold H,i. Detection of misfires is then suspended when the values of the gas torque become higher than the upper threshold.

This suspension is effected for a predetermined period. The start of this period can begin at the instant of the firing corresponding to exceeding of the upper threshold or else can be traced back retroactively to a given number of preceding engine cycles.

In fact, rises of torque due to the transmission device can be added to or subtracted from the nominal torque of the considered cylinder; the probability of not detecting the start of the perturbation by means of the upper threshold therefore is 50%. In the case of a retroactive suspension period, all misfires which were detected before the upper threshold was exceeded and which occurred during the considered period are therefore disregarded.

The end of this suspension period is related to the natural frequency of the transmission device, oscillations being able to cause variations of the gas torque for about 330 ms. It is therefore possible to choose a constant duration for the suspension period, which is reinitialized whenever the upper threshold is exceeded.

Figure 3:
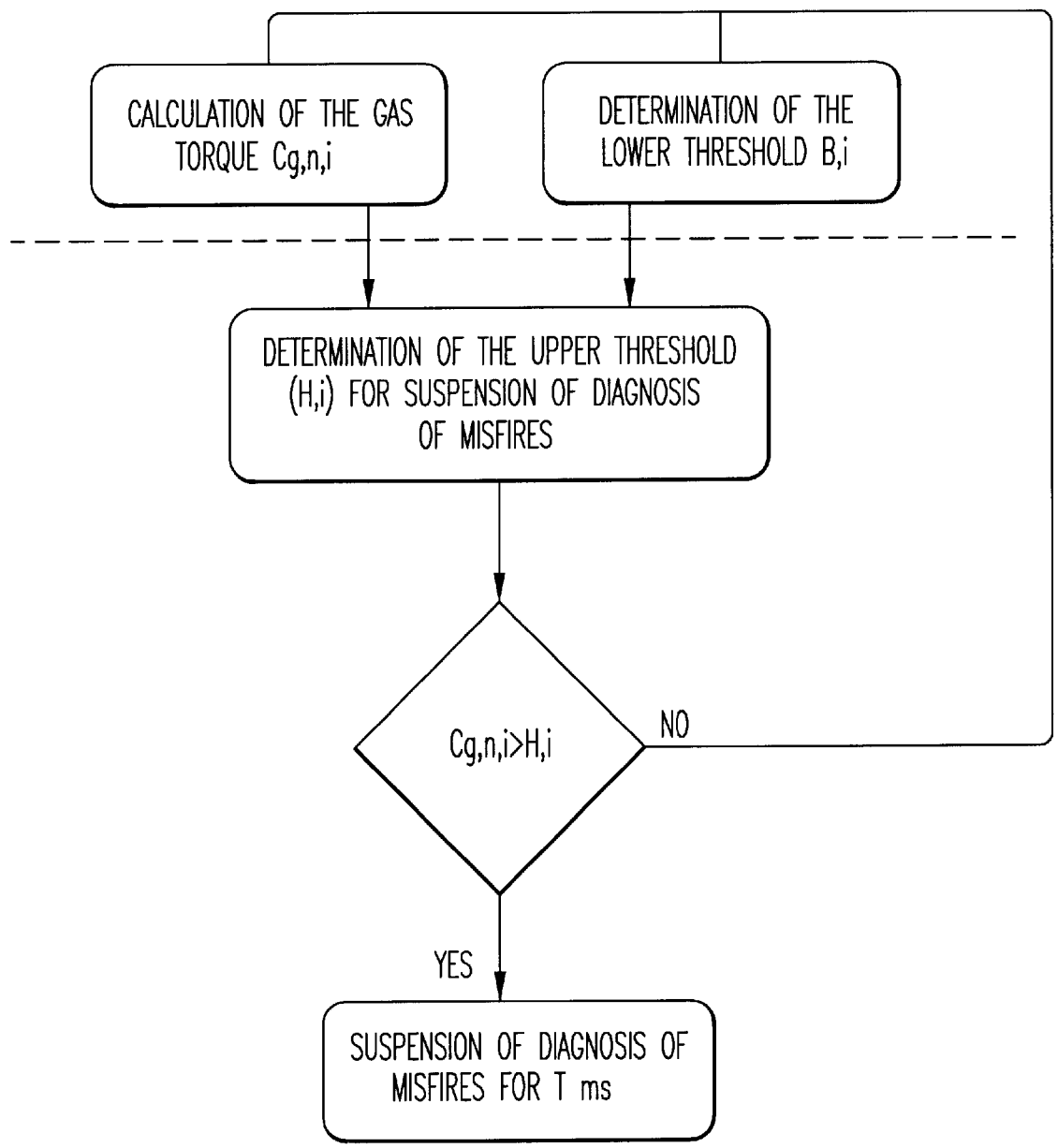
FIG. 3 is a flow chart indicating the sequence of the process according to the invention for detection of misfires.

As illustrated in FIG. 3, a process according to the invention therefore comprises the following stages, which are executed after each firing indexed n and for a given cylinder No. i:

(i)—acquisition of the value of the gas torque Cg,n,i generated by firing;

(ii)—acquisition of the lower threshold B,i for detection of misfires, which value is plotted, for example, on the basis of the engine operating conditions or else is deduced from preceding filtered values Cg,p,i of gas torque;

(iii)—construction of the upper threshold H,i using, for example, the following formula:

$$H,i = f(Cg,n,i) + (f(Cg,n,i) - B,i) \times \alpha$$

(iv)—comparison of the torque value Cg,n,i with the upper threshold H,i;

(v)—if the value Cg,n,i of the gas torque is above the upper threshold H,i, detection of possible misfires is suspended for a predetermined period T ms (200, 300, 400 ms, etc.);

(vi)—otherwise, comparison of the torque value Cg,n,i with the lower threshold B,i;

(vii)—and detection of the existence of a misfire when the value Cg,n,i of gas torque is below the lower threshold B,i.

According to this example, therefore, the upper threshold H,i is determined for each cylinder in such a way as to adapt it to the mean torque of each cylinder, thus making it possible to allow more accurately for torque drift. α is a value (0.6, for example) which can be constant or else variable (function of engine speed, of engine load and/or of the selected gear (f(Cg,n,i)−B,i), can be replaced by the torque drop which is expected at the considered operating point and which is invariant for all cylinders.

Of course, the invention is in no way limited to the described and illustrated embodiment, which has been presented only as an example.

To the contrary, the invention comprises all technical equivalents of the described means as well as combinations thereof if they are effected in accordance with its spirit.

Thus, it is possible to operate not directly on the values Cg,n,i but on filtered values. Similarly, the upper and lower thresholds can be determined by all kinds of strategies: plots taking into account the different operating points of the engine, constant percentages of nominal gas torque, etc.

As regards implementation of the device for detection of misfires, it can be achieved in diverse forms regardless of the variant chosen:

with analog electronic components, in which case the summing units, comparators and other filters are achieved by means of operational amplifiers;

or with digital electronic components, which would achieve the function by hard-wired logic;

or by a signal-processing algorithm loaded in the form of a software module, which is a component of an engine control software system for operating the microcontroller of an electronic calculator, or even by a specific (custom) chip, whose hardware and software resources will have been optimized to achieve the functions according to the invention; such a chip may or may not be microprogrammable and may be encapsulated separately or comprise all or part of a coprocessor implanted in a microcontroller or microprocessor, etc.

Similarly, the invention comprises all technical equivalents applied to an internal combustion engine, regardless of its combustion cycle (2-cycle, 4-cycle), of the fuel used (diesel or gasoline), or even of the number of its cylinders.

What is claimed is:

1. A process for detecting a misfire occurring in at least one cylinder of an internal combustion engine of a vehicle, the vehicle including an engine shaft and wheels which are connected to the engine shaft, the process comprising:
   detecting occurrence of misfire based on a value of gas torque deduced from rotation of a crankshaft of the engine;
   determining that anomalies originating from a kinetic transmission chain which connects the engine shaft with the wheels occur when the value of the gas torque becomes higher than an upper threshold which is a function of the value of the gas torque; and
   suspending detecting the occurrence of misfire for a predetermined period when occurrence of the anomalies is determined.

2. A process for detecting a misfire according to claim 1, wherein the predetermined period is a constant period of time.

3. A process for detecting a misfire according to claim 1, wherein the predetermined period is a function of operating conditions of the engine.

4. A process for detecting a misfire according to claim 1, wherein the predetermined period encompasses a given number of preceding firings.

5. A process for detecting a misfire occurring in at least one cylinder of an internal combustion engine of a vehicle, the vehicle including an engine shaft and wheels which are connected to the engine shaft, the process comprising:
   detecting occurrence of misfire based on a value of gas torque deduced from rotation of a crankshaft of the engine;
   determining that misfire occurs when the value of the gas torque becomes lower than a lower threshold;
   determining that anomalies originating from a kinetic transmission chain which connects the engine shaft with the wheels occur when the value of the gas torque becomes higher than an upper threshold which is a function of the lower threshold; and
   suspending detecting the occurrence of misfire for a predetermined period when occurrence of the anomalies is determined.

6. A process for detecting a misfire according to claim 5, wherein the upper threshold is also a function of the value.

7. A process for detecting a misfire according to claim 5, wherein the predetermined period is a constant period of time.

8. A process for detecting a misfire according to claim 5, wherein the predetermined period is a function of operating conditions of the engine.

9. A process for detecting a misfire according to claim 5, wherein the predetermined period encompasses a given number of preceding firings.

* * * * *